United States Patent [19]

Eppinger et al.

[11] Patent Number: 5,089,051

[45] Date of Patent: Feb. 18, 1992

[54] ADHESION-PROMOTING DENTAL COMPOSITION

[75] Inventors: Bernhard Eppinger; Regina Eppinger, both of Weilburg; Roland Schaefer, Friedrichsdorf, all of Fed. Rep. of Germany

[73] Assignee: Heraeus Kulzer GmbH, Hanau, Fed. Rep. of Germany

[21] Appl. No.: 596,099

[22] Filed: Oct. 11, 1990

[30] Foreign Application Priority Data

Oct. 19, 1989 [DE] Fed. Rep. of Germany ....... 3934849

[51] Int. Cl.$^5$ .................... A61K 6/02; A61K 6/08; C09J 3/14
[52] U.S. Cl. ..................... 106/35; 523/116; 523/118; 523/120; 260/998.11; 433/228.1; 433/217.1; 433/224; 433/226
[58] Field of Search ................... 106/35; 523/116, 118, 523/120; 260/998.11; 433/228.1, 217.1, 224, 226

[56] References Cited

U.S. PATENT DOCUMENTS

| | | | |
|---|---|---|---|
| 4,071,424 | 1/1978 | Dart et al. | 204/159.15 |
| 4,148,988 | 4/1979 | Masuhara et al. | 106/35 |
| 4,235,686 | 11/1980 | Dart et al. | 204/159.19 |
| 4,514,342 | 4/1985 | Billington et al. | 260/952 |
| 4,525,493 | 6/1985 | Omura et al. | 106/35 |
| 4,591,649 | 5/1986 | Hirasawa et al. | 549/232 |
| 4,640,936 | 2/1987 | Janda et al. | 522/14 |
| 4,650,847 | 3/1987 | Omura et al. | 106/35 |
| 4,806,381 | 2/1989 | Engelbrecht et al. | 427/2 |

FOREIGN PATENT DOCUMENTS

| | | |
|---|---|---|
| 0206810 | 12/1986 | European Pat. Off. . |
| 0266220 | 5/1988 | European Pat. Off. . |
| 0282280 | 9/1988 | European Pat. Off. . |
| 0310919 | 4/1989 | European Pat. Off. . |
| 0325038 | 7/1989 | European Pat. Off. . |
| 2711234 | 9/1977 | Fed. Rep. of Germany . |
| 34141658 | 10/1985 | Fed. Rep. of Germany . |
| 1408265 | 10/1975 | United Kingdom . |

OTHER PUBLICATIONS

Data sheet on Esticid pre-treatment gel from Kulzer & Co. GmbH.
Data sheet on Estiseal photocuring varnish from Kulzer & Co. GmbH.
Data sheet on Translux tungsten-halogen irradiation unit—kulzer.
Data sheet on Scotchbond adhesive from 3M Deutschland GmbH.
Data sheet on Gluma bonding system from Bayer A.G.
K. C. Tsou, "Synthesis and Evaluation of a Polymerizable Phosphate Containing Monomer for Adhesion to Tooth Structure", in Adhesive Restorative Dental Materials, ed. by Ralph Phillips, Indiana Univ. Press (1961), pp. 195-198.

Primary Examiner—William R. Dixon, Jr.
Assistant Examiner—C. Melissa Bonner
Attorney, Agent, or Firm—Frishauf, Holtz, Goodman & Woodward

[57] ABSTRACT

Adhesion promoters containing (meth)acryloyloxyethyl dihydrogen phosphate and/or di(meth)acryloyloxyethyl hydrogen phosphate and acidic (meth)acryloyloxyethyl esters of carboxylic acids can improve the adhesion of photopolymerizable tooth materials to the enamel and dentine. The very strong bonding to the dentine immediately after curing proves to be particularly advantageous.

24 Claims, No Drawings

ADHESION-PROMOTING DENTAL COMPOSITION

BACKGROUND OF THE INVENTION

1. Field of the Invention

The invention relates to a dental adhesion-promoting composition, or bonding composition, which contains an acryloyloxyethyl dihydrogen phosphate and/or diacryloyloxyethyl hydrogen phosphate, a photopolymerization catalyst, and an organic solvent.

2. Background Information

When tooth cavities are filled with a polymerizable resin-based tooth filling material, then before the filling is introduced, the tooth enamel is prepared with an acid etching solution, for example a dilute phosphoric acid solution, and is optionally also coated with a sealing material of low viscosity, which typically contains monomeric dimethacrylates and is curable chemically or by photopolymerization, in order to improve the adhesion between the tooth enamel and the resin. Sealing materials that contain a fine-grained inorganic filler in addition to the monomers have proved to be particularly suitable, because of their good physical qualities. Their adhesion is due to mechanical anchoring in the etched tooth enamel.

From the standpoint of the dental practitioner, however, etching of the tooth dentine is not recommended. If anchoring by etching the tooth enamel is impossible, for example in the case of cavities of the neck of the tooth, then adhesion promoters are used to improve the adhesion between the dentine and the resin. Many such dental adhesion-promoting compositions are known, because they play an increasingly large role, given the use of composite fillings. The initial polymerization shrinking of the composite, which causes fissuring between the filling and the hard substance of the tooth, however, is a substantial problem. This allows bacteria to invade, which can damage the pulp and cause secondary caries.

*Adhesive Restorative Dental Materials* 1961, pp. 195-198, reports on the adhesion-promoting effect of dimethacryloyloxyethyl hydrogen phosphate and various dihydrogen phosphates containing methacryloyloxy groups.

German Examined Patent Application 27 11 234, YAMAUCHI, discloses adhesives for teeth and tooth materials that may contain an acidic phosphoric acid ester, for example, in the form of dimethacryloyloxyethyl hydrogen phosphate, optionally together with other monomers, and polymerization catalysts, for instance in the form of amine/peroxide systems or UV sensitizing agents.

European Patent Application 88 527 describes an adhesion promoter that comprises a solution of a dihydrogen phosphate having at least three methacryloyloxy groups, in a volatile organic solvent, especially an alkanol. Along with this material, a bonding or sealing material ("intermediate bonding resin") may be used to increase the bonding of the tooth filling material to the tooth substance.

Other compositions that improve the bonding of photopolymerizable dental materials to the dentine and likewise contain methacryloyloxyethyl hydrogen phosphates, along with a photopolymerization catalyst are known from German Patents 34 14 163 and 34 14 165 and U.S. Pat. No. 4,640,936, JANDA.

Carboxylic acids and carboxylic acid derivatives containing polymerizable groups which exhibit good adhesion with the hard substance of the tooth are also known, such as 4-methacryloyloxyethyl trimellitic acid and its anhydride, pyromellitic acid dimethacryloyloxyethyl ester, esters of carboxynaphthalene dicarboxylic acid anhydrides containing acryloyloxy or methacryloyloxy groups in the alcohol remainder (U.S. Pat. No. 4,591,649 and German Patent 35 10 962), and omega-(meth)acryloyloxy-alpha, alpha-alkanedicarboxylic acids (European Patent Application 206 810, IWAMOTO et al.).

U.S. Pat. No. 4,806,381 and German Patent Disclosure Document DE-OS 35 36 077, ENGELBRECHT, relate to oligomeric or prepolymeric compounds having both polymerizable unsaturated groups and acid radicals, their salts or their active derivative radicals, and particularly having carboxylate, phosphate, phosphonate, sulfonate and borate radicals and their reactive derivatives. Polymerizable mixtures containing these compounds can be used as adhesion-promoting polymerizable films between the tooth substance and the polymerizable resin material.

The composition described in European Patent Application 282 280, WAKUMOTO, serving to improve the bonding of composite material to the enamel and dentine, contains polymerizable compounds with acid radicals in the molecule, such as aromatic carboxylic acids or phosphoric acids with acryloyloxy or methacryloyloxy groups, for example, 4-methacryloyloxyethoxycarbonylphthalic acid or its anhydride.

The adhesion promoter known from European Patent Application 310 919, YAMAZAKI, for improving the adhesion between the tooth substance and the composite material contains a fluoralkyl ester of acrylic acid, fluoracrylic acid or methacrylic acid and/or its polymer or copolymer, and optionally additionally includes other monomers that improve the adhesion, for example having carboxylic acid, phosphoric acid, mercapto or sulfonic acid groups. It can be cured by chemical polymerization or photopolymerization.

SUMMARY OF THE INVENTION

It is an object of the invention to provide a composition of the type defined at the outset above, with which the bonding strength between the hard substance of the tooth, particularly the dentine, and photopolymerizable dental materials can be improved. The use of the composition is intended above all to prevent the formation of peripheral fissures caused by the initial polymerization shrinkage, and the secondary caries caused thereby.

The adhesion promoter that attains this object is characterized in that it comprises from 1 to 25% by weight of an acryloyloxyalkyl hydrogen phosphate wherein the alkyl group of which has 2 to 6 carbon atoms; for example, (meth)acryloyloxyethyl dihydrogen phosphate and/or di(meth)acryloyloxyethyl hydrogen phosphate; 3 to 40% by weight of at least one acidic carboxylic acid ester selected from the group comprising dicarboxylic acid mono(meth)acryloyloxyethyl ester, o-trimellitic acid mono(meth)acryloyloxyethyl ester, and pyromellitic acid di(meth)acryloyloxyethyl ester; 0.05 to 5% by weight of the photopolymerization catalyst; and the remainder an organic solvent.

Preferably, the adhesion promoter comprises from 5 to 20% by weight of (meth)acryloyloxyalkyl dihydrogen phosphate with the alkyl group having 2 to 6 carbon atoms, preferably (meth)acryloyloxyethyl dihydrogen phosphate and/or di(meth)acryloyloxyalkyl hydrogen phosphate with the alkyl group having 2 to 6 carbon atoms, preferably di(meth)acryloyloxyethyl hydrogen phosphate; 5 to 30% by weight of at least one acidic carboxylic acid ester selected from the group comprising dicarboxylic acid mono(meth)acryloyloxyethyl ester, o-trimellitic acid mono(meth)acryloyloxyethyl ester, and pyromellitic acid di(meth)acryloyloxyethyl ester; 0.1 to 2% by weight of the photopolymerization catalyst; and the remainder being an organic solvent, e.g., ethanol, propanol, isopropanol, acetone and butanol, with ethanol being preferred.

The monoacryloyloxyethyl esters and/or monomethacryloyloxyethyl esters of alkane dicarboxylic acids having from one to six carbon atoms in the alkane radical, maleic acid, benzene dicarboxylic acids and cyclohexane dicarboxylic acids have proved particularly suitable as dicarboxylic acid mono(meth)acryloyloxyethyl esters.

Adhesion promoters that contain a mixture of two of the unsaturated carboxylic acid esters have proved particularly suitable.

Ketones, known for instance from British patent 1,408,265 and corresponding U.S. Pat. No. 4,071,424, DART+NEMCEK/ICI, the entire contents of which is incorporated by reference herein, have proved suitable as photopolymerization catalysts. Camphor quinone is preferred.

The adhesion promoter according to the invention serves to improve the adhesion of photopolymerizable tooth filling materials both to the enamel and to the dentine. It may be used alone or together with a photopolymerizable sealing material. However, it is also possible to use the adhesion promoter only together with the sealing material, if chewing surfaces or exposed necks of teeth are to be sealed with this sealing material.

When the adhesion promoter is used, the high values for bonding strength immediately after curing of the tooth filling material (initial bonding strength) and after 24-hour storage in water at 37° C. are particularly striking. Unexpectedly, using the unsaturated phosphate and the unsaturated acidic carboxylic ester jointly leads to a bonding strength twice as high as that attained with the use of phosphate or acid ester alone. Peripheral fissures between the tooth substance and the filling material do not occur; the very good initial bonding counteracts the fissuring resulting from shrinkage of the tooth filling material during the polymerization.

DETAILED DESCRIPTION OF THE INVENTION

The following examples describe the composition of adhesion promoters according to the invention in further detail. The bonding strength between the dentine and the resin tooth filling (or composite tooth filling) and between the tooth enamel and the resin tooth filling, attained with these adhesion promoters using a photopolymerizable sealing material, will be determined.

EXAMPLE 1

5.0% dimethacryloyloxyethyl hydrogen phosphate
15.0% maleic acid monomethacryloyloxyethyl ester
79.9% ethanol
0.1% camphor quinone

EXAMPLE 2

5.0% dimethacryloyloxyethyl hydrogen phosphate
15.0% phthalic acid monomethacryloyloxyethyl ester
79.9% ethanol
0.1% camphor quinone

EXAMPLE 3

5.0% dimethacryloyloxyethyl hydrogen phosphate
15.0% succinic acid monomethacryloyloxyethyl ester
79.9% ethanol
0.1% camphor quinone

EXAMPLE 4

5.0% dimethacryloyloxyethyl hydrogen phosphate
5.0% phthalic acid monomethacryloyloxyethyl ester
10.0% maleic acid monomethacryloyloxyethyl ester
79.9% ethanol
0.1% camphor quinone

EXAMPLE 5

5.0% dimethacryloyloxyethyl hydrogen phosphate
7.5% phthalic acid monomethacryloyloxyethyl ester
7.5% maleic acid monomethacryloyloxyethyl ester
79.9% ethanol
0.1% camphor quinone

EXAMPLE 6

5.0% dimethacryloyloxyethyl hydrogen phosphate
10.0% phthalic acid monomethacryloyloxyethyl ester
5.0% maleic acid monomethacryloyloxyethyl ester
79.9% ethanol
0.1% camphor quinone

EXAMPLE 7

5.0% methacryloyloxyethyl dihydrogen phosphate
15.0% maleic acid monomethacryloyloxyethyl ester
79.9% ethanol
0.1% camphor quinone

EXAMPLE 8

5.0% methacryloyloxyethyl dihydrogen phosphate
15.0% phthalic acid monomethacryloyloxyethyl ester
79.9% ethanol
0.1% camphor quinone

EXAMPLE 9

5.0% methacryloyloxyethyl dihydrogen phosphate
15.0% succinic acid monomethacryloyloxyethyl ester
79.9% ethanol
0.1% camphor quinone

EXAMPLE 10

5.0% methacryloyloxyethyl dihydrogen phosphate
5.0% phthalic acid monomethacryloyloxyethyl ester
10.0% maleic acid monomethacryloyloxyethyl ester
79.9% ethanol
0.1% camphor quinone

EXAMPLE 11

5.0% methacryloyloxyethyl dihydrogen phosphate
7.5% phthalic acid monomethacryloyloxyethyl ester
7.5% maleic acid monomethacryloyloxyethyl ester
79.9% ethanol
0.1% camphor quinone

EXAMPLE 12

5.0% methacryloyloxyethyl dihydrogen phosphate
10.0% phthalic acid monomethacryloyloxyethyl ester
5.0% maleic acid monomethacryloyloxyethyl ester
79.9% ethanol
0.1% camphor quinone

EXAMPLE 13

5.0% methacryloyloxyethyl dihydrogen phosphate
15.0% pyromellitic acid dimethacryloyloxyethyl ester
79.9% ethanol
0.1% camphor quinone

EXAMPLE 14

5.0% methacryloyloxyethyl dihydrogen phosphate
15.0% o-trimellitic acid monomethacryloyloxyethyl ester
79.9% ethanol
0.1% camphor quinone

EXAMPLE 15

Comparison 5.0% methacryloyloxyethyl dihydrogen phosphate
94.9% ethanol
0.1% camphor quinone

EXAMPLE 16

Comparison 15.0% methacryloyloxyethyl dihydrogen phosphate
84.9% ethanol
0.1% camphor quinone

EXAMPLE 17

Comparison 15.0% maleic acid monomethacryloyloxyethyl ester
84.9% ethanol
0.1% camphor quinone

EXAMPLE 18

Comparison 15.0% phthalic acid monomethacryloyloxyethyl ester
84.9% ethanol
0.1% camphor quinone Each of the adhesion promoters described in the examples is painted, one at a time, onto the dentine surface of an extracted tooth, the surface of which has been sawn flat with a diamond saw, polished, cleaned (with aqueous ethylene diamine tetraacetic acid solution, pH 8.5), and dried. Once the ethanol has evaporated, ESTISEAL ® LC, a photopolymerizable sealing material made by Kulzer GmbH, is applied, and cured by exposing the tooth for 20 seconds to irradiation by the TRANSLUX ® halogen light-curing unit made by Kulzer GmbH. Next, DURAFILL, a photopolymerizable tooth filling material (composite) made by Kulzer GmbH is applied and likewise cured by a 20-second exposure to the halogen light-curing unit.

The teeth thus treated are subjected to shearing tests, to determine the bonding strength of the resin filling. The values measured immediately after curing (a maximum of 30 seconds) and after 24 hours of storage in water at 37° C. are given in Table I. The bonding strength values correspondingly measured with two adhesion promoters available on the market, SCOTCHBOND ® II and GLUMA ®, are also shown in the table for comparison purposes.

For determining the adhesion strength of the resin filling to the tooth enamel, one of the adhesion promoters described in examples 1 and 5 is painted onto the enamel surface of an extracted tooth, the surface having been sawn flat with a diamond saw, polished, cleaned (with aqueous ethylene diamine tetraacetic acid solution, pH 8.5), and dried; the adhesion promoter is painted on either a) directly or b) after the tooth has been etched with 35% phosphoric acid (ESTICID ® made by Kulzer GmbH). After the ethanol has evaporated, ESTISEAL ® LC, a photopolymerizable sealing material made by Kulzer GmbH, is applied and cured with a 20 second exposure to the halogen light-curing unit TRANSLUX ® made by Kulzer GmbH. Next, DURAFILL, a photopolymerizable tooth filling material (composite) made by Kulzer GmbH is applied and likewise cured by a 20 second exposure to the halogen light-curing unit.

The bonding strength values determined by shearing tests after 24 hours of storage in water at 37° C. are shown in Table II. The bonding strength values correspondingly measured with two adhesion promoters available on the market, SCOTCHBOND ® II and GLUMA ®, are also shown in the table for comparison purposes.

TABLE I

| Example | Bonding strength (N/mm$^2$) immediately after curing | after 24 hours' storage in water 37° C. |
|---|---|---|
| 1 | 10.5 | 13.0 |
| 2 | 10.8 | 11.0 |
| 3 | 10.9 | 12.6 |
| 4 | 14.7 | 15.0 |
| 5 | 11.0 | 15.3 |
| 6 | 10.0 | 17.5 |
| 7 | 11.4 | 13.1 |
| 8 | 11.3 | 12.1 |
| 9 | 11.5 | 13.6 |
| 10 | 14.1 | 16.0 |
| 11 | 12.1 | 15.0 |
| 12 | 11.8 | 16.1 |
| 13 | 10.5 | 12.3 |
| 14 | 9.5 | 12.6 |
| 15* | 3.9 | 5.4 |
| 16* | 6.5 | 7.6 |
| 17* | 5.0 | 6.9 |
| 18* | 6.2 | 7.3 |
| SCOTCHBOND ® | 2.4 | 7.1 |
| GLUMA ® | 6.5 | 8.9 |

*(for comparison)

TABLE II

| Example | Bonding strength (N/mm$^2$) after 24 hours storage in water, 37° C. |
|---|---|
| 1 | a) 7<br>b) 15 |
| 5 | a) 8<br>b) 15 |
| Scotchbond ® | a) 3<br>b) 11 |
| Gluma ® | a) 2<br>b) 11 |
| Without adhesion promoter | a) 1<br>b) 12 | a) = unetched
b) = etched

We claim:

1. A dental adhesion-promoting composition comprising
   from 1 to 25% by weight of at least one acryloyloxyalkyl hydrogen phosphate selected from the group consisting of (meth)acryloyloxyalkyl dihydrogen phosphate with the alkyl group of which having 2 to 6 carbon atoms and di(meth)acryloyloxyalkyl hydrogen phosphate with the alkyl group of which having 2 to 6 carbon atoms;
   3 to 40% by weight of at least one acidic carboxylic acid ester selected from the group consisting of dicarboxylic acid mono(meth)acryloyloxyethyl ester, o-trimellitic acid mono(meth)acryloyloxyethyl ester, and pyromellitic acid di(meth)acryloyloxyethyl ester;
   0.05 to 5% by weight of a photopolymerization catalyst; and
   the remainder being an organic solvent.

2. The dental adhesion-promoting composition of claim 1 comprising
   from 5 to 20% by weight of at least one hydrogen phosphate selected from the group consisting of (meth)acryloyloxyethyl dihydrogen phosphate and di(meth)acryloyloxyethyl hydrogen phosphate;
   5 to 30% by weight of at least one acidic carboxylic acid ester selected from the group consisting of dicarboxylic acid mono(meth)acryloyloxyethyl ester, o-trimellitic acid mono(meth)acryloyloxyethyl ester and pyromellitic acid di(meth)acryloyloxyethyl ester;
   0.1 to 2% by weight of a photopolymerization catalyst; and the remainder ethanol.

3. The dental adhesion-promoting composition of claim 1, wherein the dicarboxylic acid is an alkane dicarboxylic acid having from one to six carbon atoms in the alkane radical, maleic acid, a benzene dicarboxylic acid or a cyclohexane dicarboxylic acid.

4. The dental adhesion-promoting composition of claim 1, wherein the acryloyloxyalkyl hydrogen phosphate is (meth)acryloyloxyethyl dihydrogen phosphate.

5. The dental adhesion-promoting composition of claim 1, wherein the acryloyloxyalkyl hydrogen phosphate is di(meth)acryloyloxyethyl hydrogen phosphate.

6. The dental adhesion-promoting composition according to claim 1, wherein the acryloyloxyalkyl hydrogen phosphate is a mixture of (meth)acryloyloxyethyl dihydrogen phosphate and di(meth)acryloyloxyethyl hydrogen phosphate.

7. The dental adhesion-promoting composition of claim 1, comprising two of the acidic carboxylic acid esters.

8. The dental adhesion-promoting composition of claim 1, wherein the acidic carboxylic acid ester is mono(meth)acryloyloxyethyl ester of succinic acid.

9. The dental adhesion-promoting composition of claim 1, wherein the acidic carboxylic acid ester is maleic acid mono(meth)acryloyloxyethyl ester, phthalic acid mono(meth)acryloyloxyethyl ester or a mixture thereof.

10. The dental adhesion-promoting composition of claim 1, wherein the photopolymerization catalyst is camphor quinone.

11. The dental adhesion-promoting composition of claim 1, wherein said organic solvent is selected from the group consisting of ethanol, propanol, isopropanol, butanol and acetone.

12. The dental adhesion-promoting composition of claim 1, wherein the organic solvent is ethanol.

13. The dental adhesion-promoting composition of claim 2, wherein the acryloxyalkyl hydrogen phosphate is dimethacryloyloxyethyl hydrogen phosphate, the acidic carboxylic acid ester is maleic acid monomethacryloxyethyl ester and the photopolymerization catalyst is camphor quinone.

14. The dental adhesion-promoting composition of claim 2, wherein the acryloxyalkyl hydrogen phosphate is dimethylacryloyloxyethyl hydrogen phosphate, the acidic carboxylic acid ester is phthalic acid monomethacryloyloxyethyl ester and the photopolymerization catalyst is camphor quinone.

15. The dental adhesion-promoting composition of claim 2, wherein the acryloxyalkyl hydrogen phosphate is dimethyacryloyloxyethyl hydrogen phosphate, the acidic carboxylic acid ester is succinic acid monomethacryloyloxyethyl ester and the photopolymerization catalyst is camphor quinone.

16. The dental adhesion-promoting composition of claim 2, wherein the acryloxyalkyl hydrogen phosphate is dimethacryloyloxyethyl hydrogen phosphate, the acidic carboxylic acid ester comprises phthalic acid monomethacryloyloxyethyl ester and maleic acid monomethacryloyloxyethyl ester and the photopolymerization catalyst is camphor quinone.

17. The dental adhesion-promoting composition of claim 2, wherein the acryloxyalkyl hydrogen phosphate is methacryloyloxyethyl dihydrogen phosphate, the photopolymerization catalyst is camphor quinone and the acidic carboxylic acid ester is maleic acid monomethacryloyloxyethyl ester.

18. The dental adhesion-promoting composition of claim 2, wherein the acryloxyalkyl hydrogen phosphate is methacryloyloxyethyl dihydrogen phosphate, the photopolymerization catalyst is camphor quinone and the acidic carboxylic acid ester is phthalic acid monomethacryloyloxyethyl ester.

19. The dental adhesion-promoting composition of claim 2, wherein the acryloxyalkyl hydrogen phosphate is methacryloyloxyethyl dihydrogen phosphate, the photopolymerization catalyst is camphor quinone and the acidic carboxylic acid ester is succinic acid monomethacryloyloxyethyl ester.

20. The dental adhesion-promoting composition of claim 2, wherein the acryloxyalkyl hydrogen phosphate is methacryloyloxyethyl dihydrogen phosphate, the photopolymerization catalyst is camphor quinone and the acidic carboxylic acid ester comprises phthalic acid monomethacryloyloxyethyl ester and maleic acid monomethacryloyloxyethyl ester.

21. The dental adhesion-promoting composition of claim 2, wherein the acryloxyalkyl hydrogen phosphate is methacryloyloxyethyl dihydrogen phosphate, the photopolymerization catalyst is camphor quinone and the acidic carboxylic acid ester is pyromellitic acid dimethacryloyloxyethyl ester.

22. The dental adhesion-promoting composition of claim 2, wherein the acryloxyalkyl hydrogen phosphate is methacryloyloxyethyl dihydrogen phosphate, the photopolymerization catalyst is camphor quinone and the acidic carboxylic acid ester is o-trimellitic acid monomethacryloyloxyethyl ester.

23. The dental adhesion-promoting composition of claim 2, wherein the photopolymerization catalyst is camphor quinone.

24. The dental adhesion-promoting composition of claim 1, comprising ethanol, 5% by weight of dimethacryloyloxyethyl hydrogen phosphate, 5 to 15% by weight of maleic acid monomethacryloyloxyethyl ester, and 0.1% by weight of camphor quinone.

* * * * *